United States Patent [19]
Lan

[11] Patent Number: 6,058,578
[45] Date of Patent: May 9, 2000

[54] CLAMP FOR JOINING THE ENDS OF A CORD

[75] Inventor: Chin-Kuo Lan, Taoyuan Hsien, Taiwan

[73] Assignee: Taiwan Industrial Fastener Corporation, Taipei, Taiwan

[21] Appl. No.: 09/114,160

[22] Filed: Jul. 13, 1998

[30] Foreign Application Priority Data

Jul. 22, 1997 [TW] Taiwan .................................. 86212280

[51] Int. Cl.[7] .............................. A44B 19/00; F16G 11/00
[52] U.S. Cl. .............................. 24/429; 24/115 G; 24/431
[58] Field of Search .............................. 24/415, 429, 430,
24/431, 300–302, 115 R, 115 G, 115 W,
122.3, 122.6, 130, 136 R, 136 D, 265 EC;
403/265–268

[56] References Cited

U.S. PATENT DOCUMENTS

| | | | |
|---|---|---|---|
| 4,878,269 | 11/1989 | Anscher et al. | 24/115 G |
| 5,347,692 | 9/1994 | Ebata | 24/429 |
| 5,379,496 | 1/1995 | Krauss | 24/115 G X |
| 5,416,951 | 5/1995 | Keyaki et al. | 24/431 |
| 5,666,699 | 9/1997 | Takahashi | 24/115 G |
| 5,671,505 | 9/1997 | Anscher | 24/115 G |
| 5,690,444 | 11/1997 | Yuuki et al. | 24/429 X |
| 5,737,808 | 4/1998 | Ikeda | 24/115 G |

*Primary Examiner*—Anthony Knight
*Assistant Examiner*—Robert J. Sandy
*Attorney, Agent, or Firm*—Beveridge, DeGrandi, Weilacher & Young, LL

[57] ABSTRACT

A clamp for joining the ends of a cord, including a cup-like hollow shell into which the ends of the cord are inserted, and a retaining member plugged into the shell to hold down the ends of the cord, the retaining member having a clamping unit at one end plugged into the shell, and a head at an opposite end stopped outside the shell, the clamping unit having a tapered hollow block fit tightly in the shell, a rectangular frame suspended inside the shell, two elongated connecting walls connected between the tapered hollow block and the rectangular frame at top and bottom sides, a receiving hole defined within the rectangular frame which receives the ends of the cord, and two springy clamping arms respectively raised from left and right side walls of the rectangular frame and terminating in a respective serrated end block, the serrated end blocks of the springy clamping arms being forced inwards and clamped on the ends of the cord at two opposite sides to hold down the ends of the cord in the retaining member when the clamping unit is inserted into the shell.

3 Claims, 8 Drawing Sheets

CLAMP FOR JOINING THE ENDS OF A CORD

BACKGROUND OF THE INVENTION

The present invention relates to a clamp for joining the ends of a cord, and more particularly to such a clamp which comprises a shell which receives the ends of the cord, and a retaining member which is plugged into the shell to hold down the ends of the cord.

Figure 8:
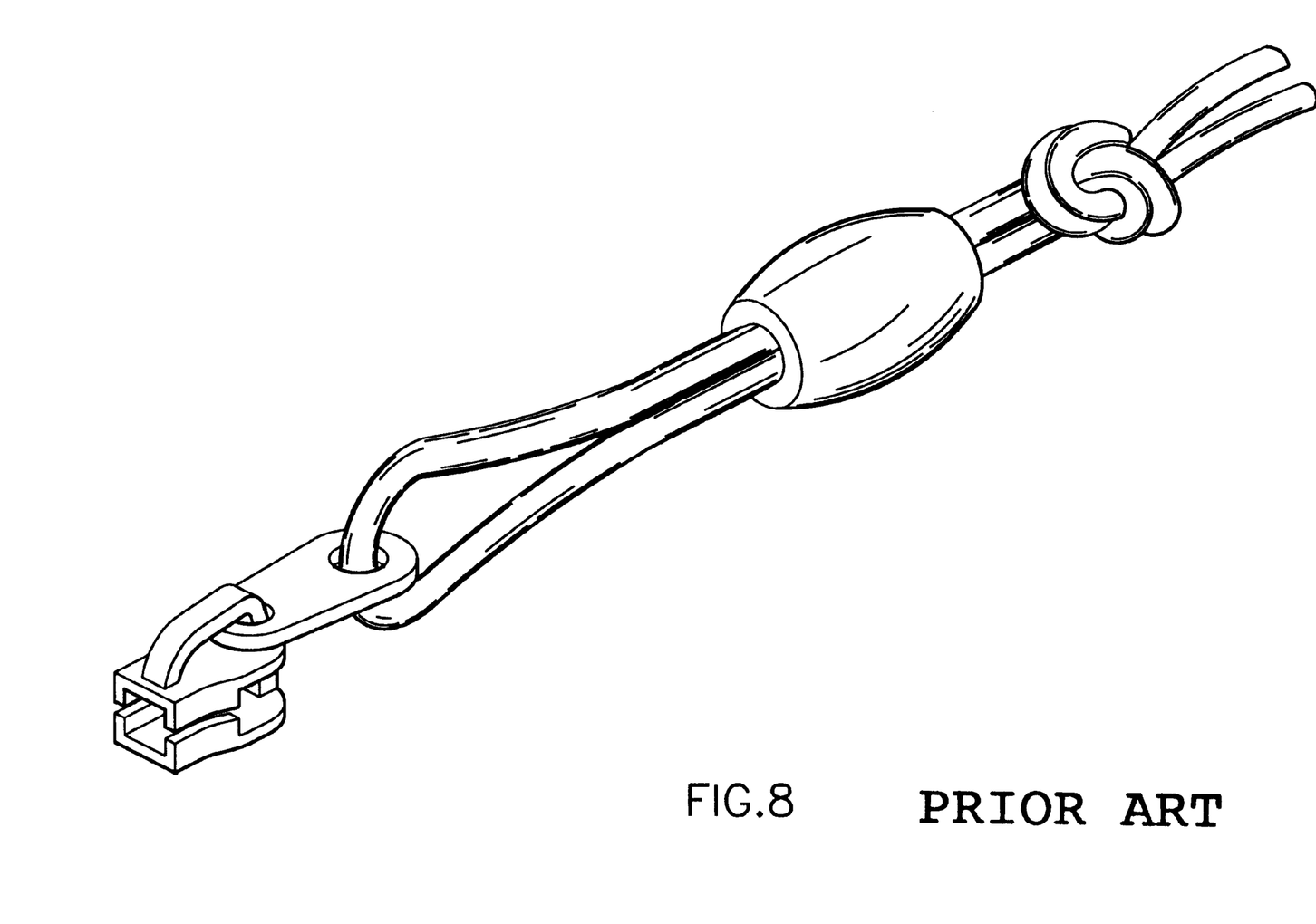
FIG. 8 shows an oval shell fastened to a cord at a pull tab of a zipper slide according to the prior art.

The pull tab of a zipper may be attached with a pull cord for pulling by hand. When the pull cord is inserted through a hole on the pull tab, the ends of the pull cord must be fastened together. Conventionally, a hollow oval shell is used and sleeved onto the ends of the pull cord (see FIG. 8), and then the ends of the pull cord are tied up. Because the knot in the ends of the pull cord tends to be unfastened, the pull cord may drop from the pull tab. Furthermore, because the hollow oval shell does not cover the knot in the ends of the pull cord, the arrangement of the pull cord and the hollow oval shell obstruct the sense of beauty of the article which is equipped with the zipper.

SUMMARY OF THE INVENTION

The present invention has been accomplished to provide a clamp for joining the ends of a cord which eliminates the aforesaid drawbacks. The clamp joins the ends of the cord and keeps the ends of the cord from sight. Furthermore, the clamp has a nice looking. According to the invention, the clamp comprises a cup-like hollow shell into which the ends of the cord are inserted, and a retaining member plugged into the shell to hold down the ends of the cord. The retaining member comprises a clamping unit at one end plugged into the shell, and a head at an opposite end stopped outside the shell. The clamping unit comprises a tapered hollow block fit tightly in the shell, a rectangular frame suspended inside the shell, two elongated connecting walls connected between the tapered hollow block and the rectangular frame at top and bottom sides, a receiving hole defined within the rectangular frame which receives the ends of the cord, and two springy clamping arms respectively raised from left and right side walls of the rectangular frame and terminating in a respective serrated end block. The serrated end blocks of the springy clamping arms are forced inwards and clamped on the ends of the cord at two opposite sides to hold down the ends of the cord in the retaining member when the clamping unit is inserted into the shell.

DETAILED DESCRIPTION OF THE PREFERRED EMBODIMENT

Figure 1:
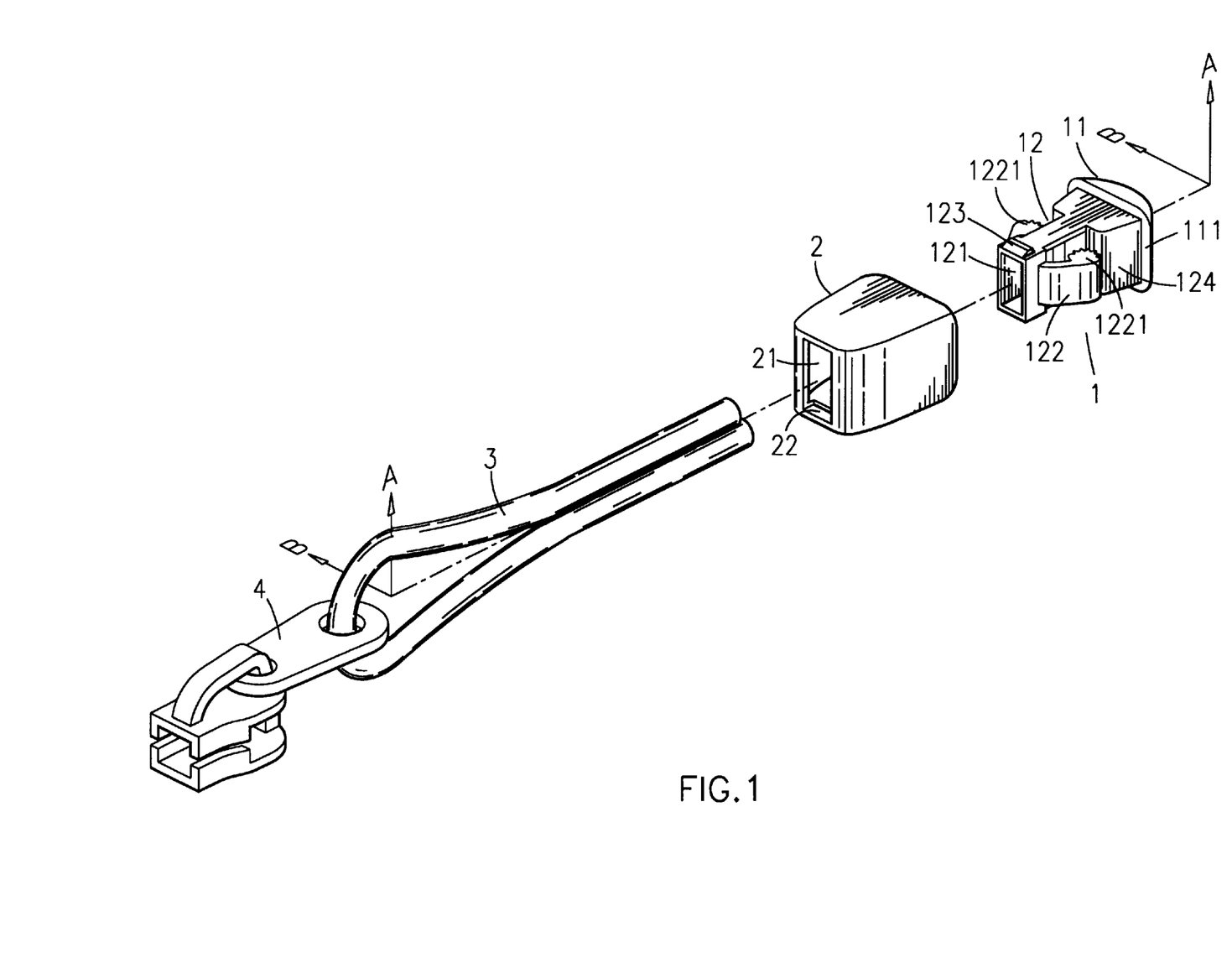
FIG. 1 is an exploded view of a clamp according to the present invention.
Figure 2:
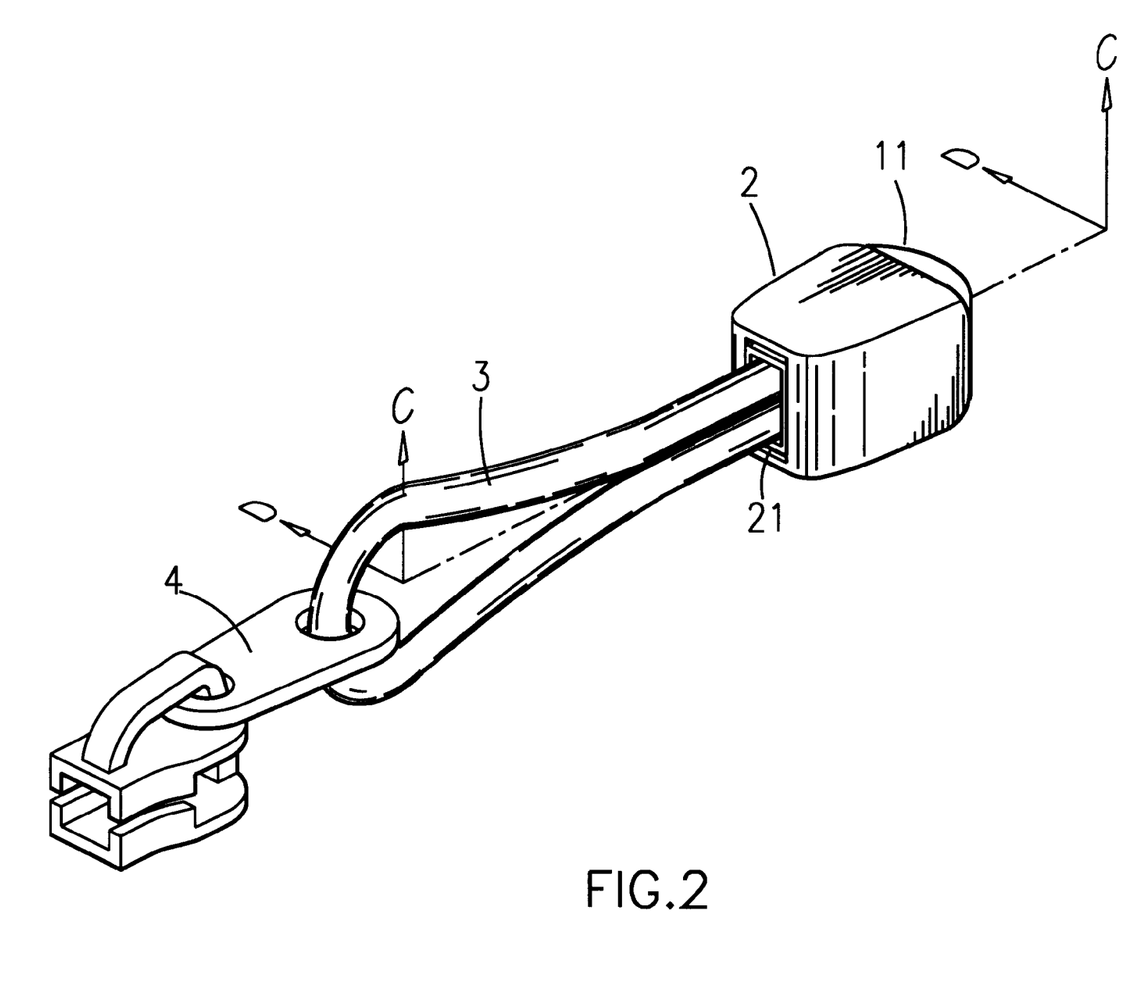
FIG. 2 shows the clamp fastened to the ends of a cord at the pull tab of a zipper slide according to the present invention.
Figure 3:
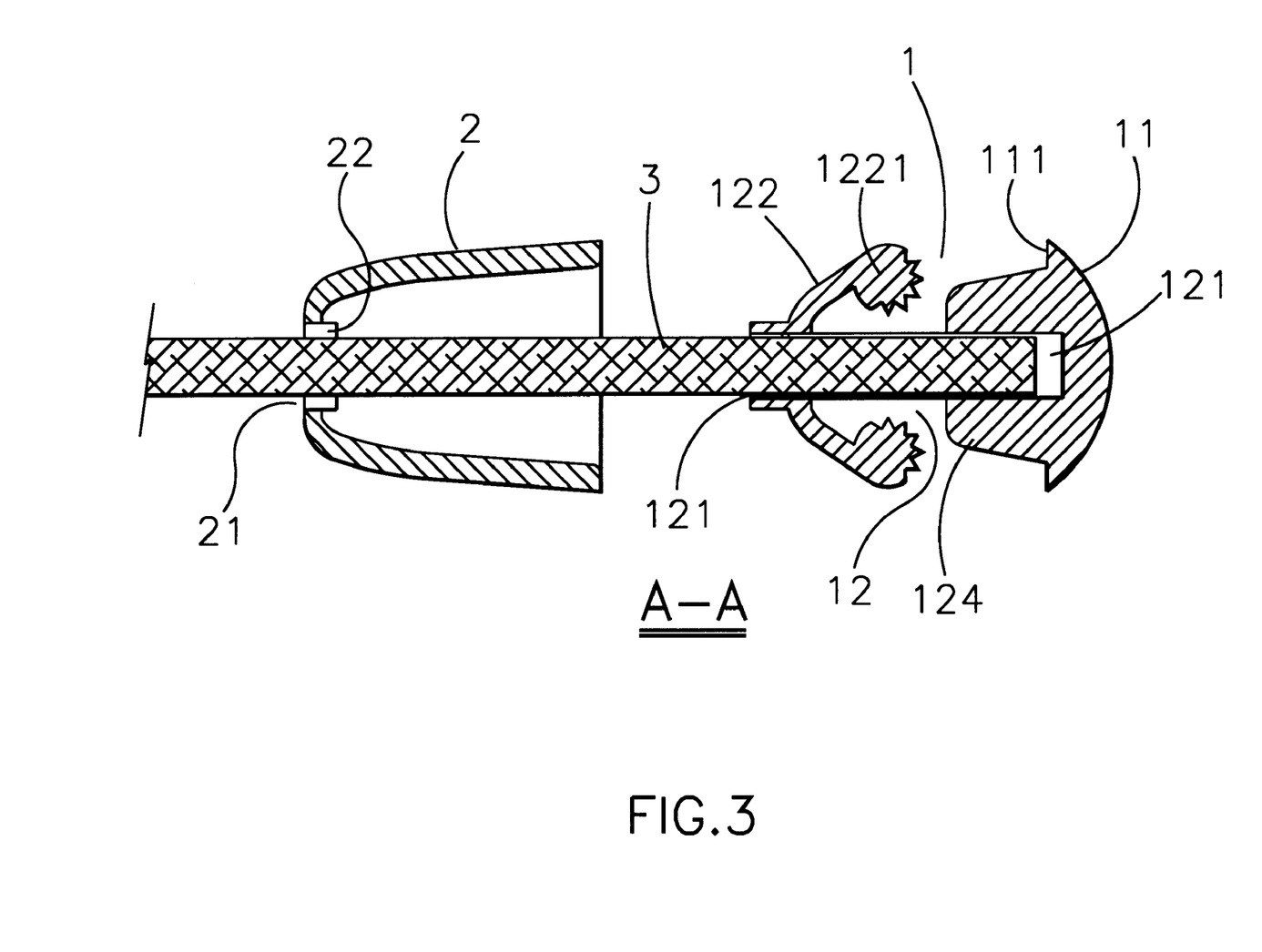
FIG. 3 is a sectional view taken along line A—A of FIG. 1.
Figure 4:
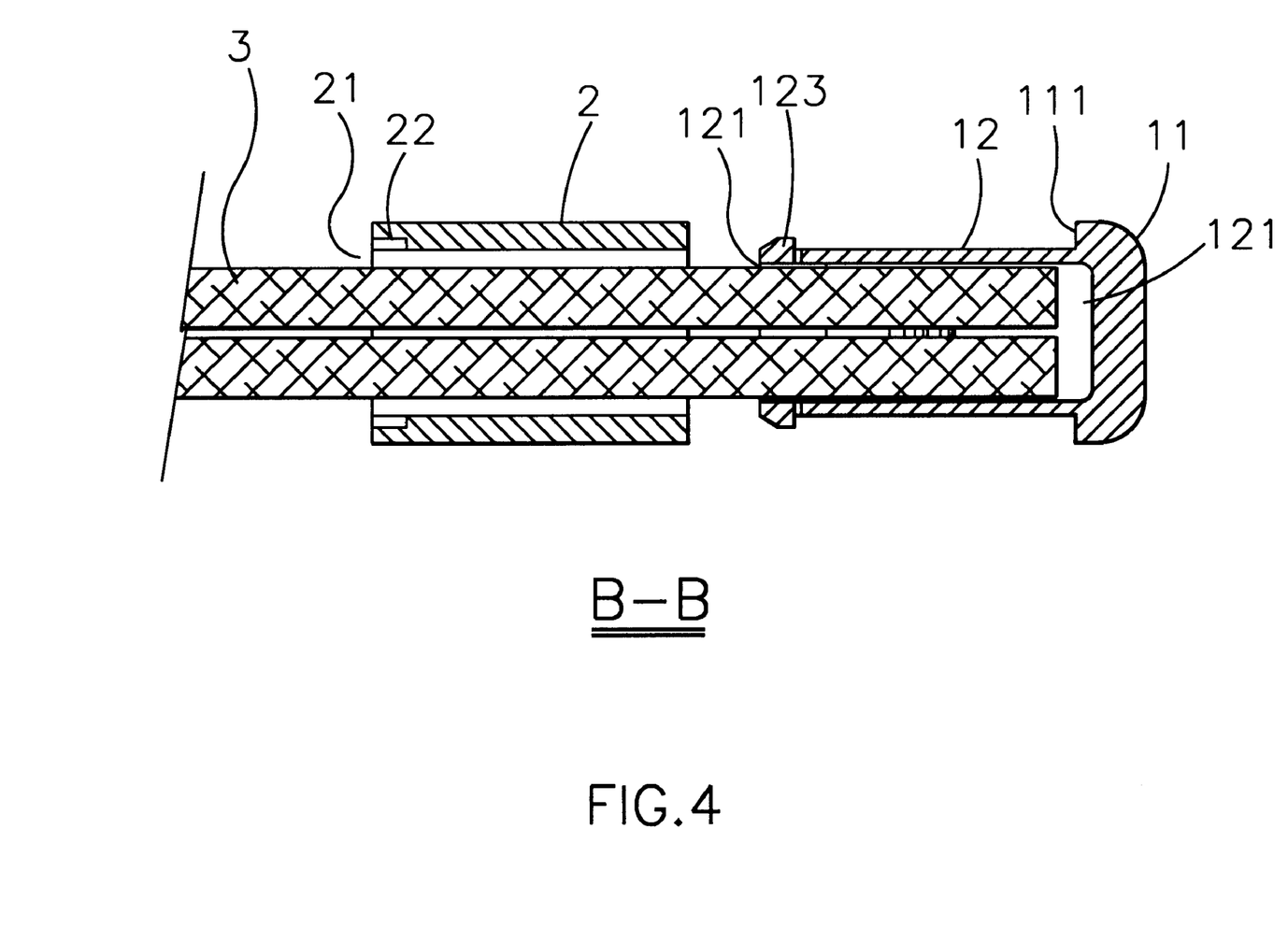
FIG. 4 is a sectional view taken along line B—B of FIG. 1.
Figure 5:
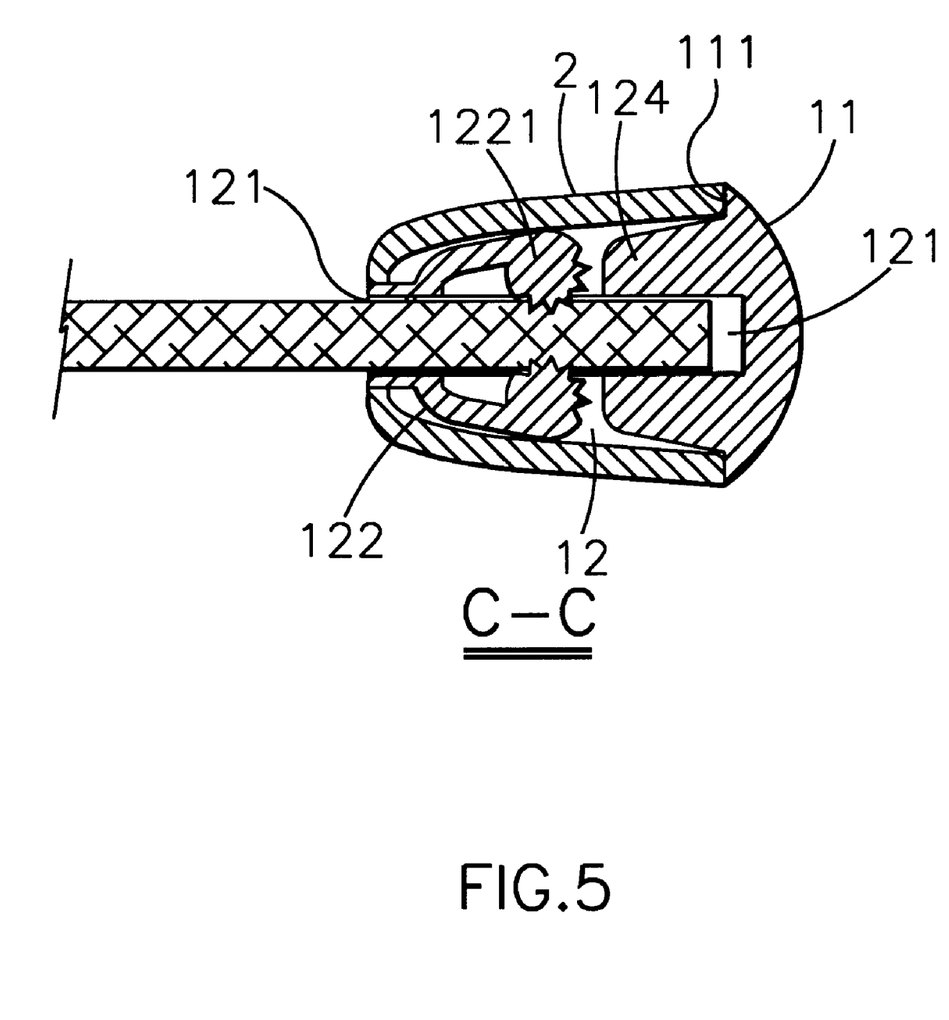
FIG. 5 is a sectional view taken along line C—C of FIG. 2.
Figure 6:
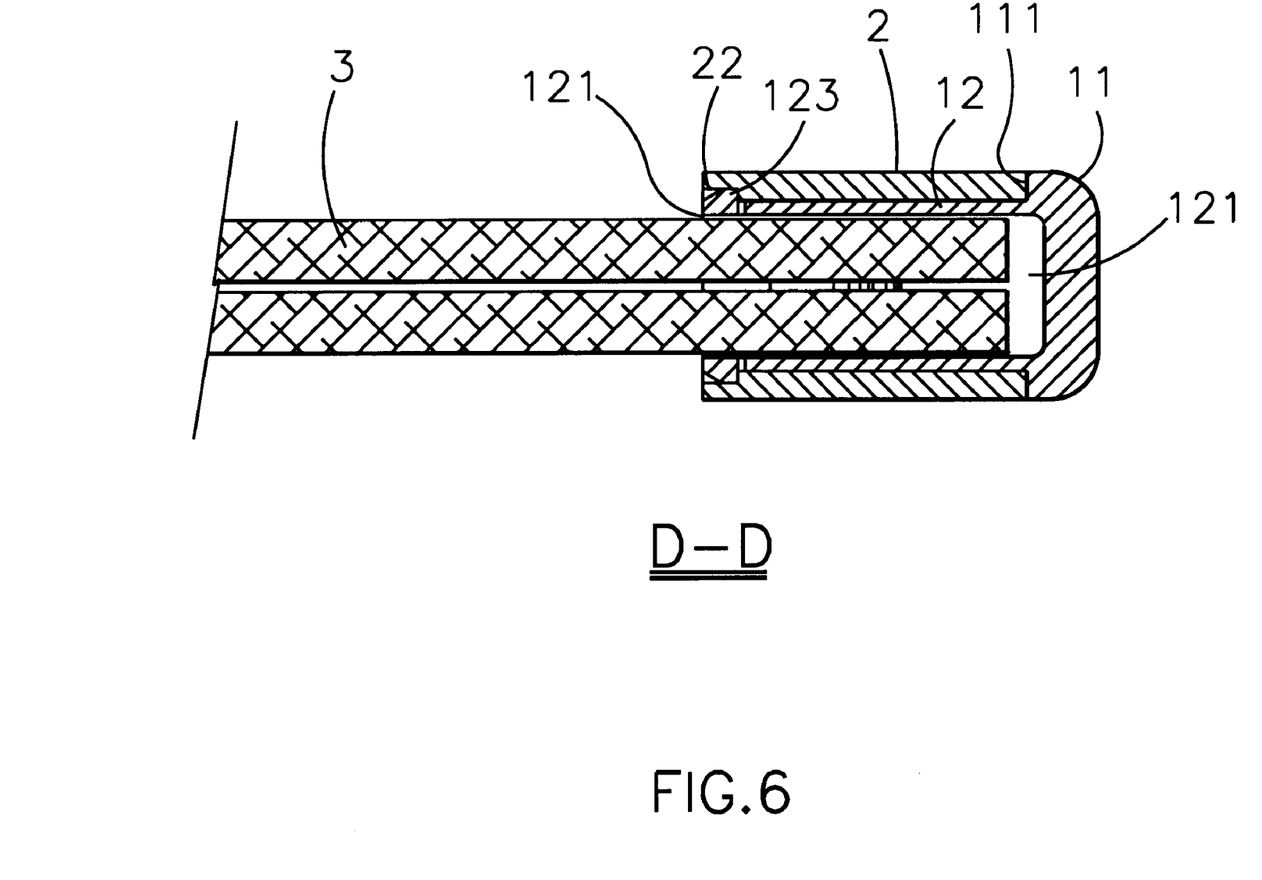
FIG. 6 is a sectional view taken along line D—D of FIG. 2.

Referring to FIGS. 1 and 2, a clamp in accordance with the present invention is generally comprised of a retaining member 1, and a shell 2.

The retaining member 1 comprises a clamping unit 12, a head 11 integral with one end of the clamping unit 12, and a shoulder 111 defined between the head 11 and the clamping unit 12. The clamping unit 12 comprises a tapered hollow block 124 extended from the head 11, a rectangular frame, two elongated connecting walls connected between the tapered hollow block 124 and the rectangular frame at top and bottom sides, a receiving hole 121 defined within the rectangular frame, two coupling flanges 123 respectively raised from top and bottom side walls of the rectangular frame, and two springy clamping arms 122 respectively raised from left and right side walls of the rectangular frame and curved towards the tapered hollow block 124 and terminating in a respective serrated end block 1221.

The shell 2 is a hollow, cup-like member having a through hole 21 at the front side wall thereof, and two coupling grooves 22 at two opposite sides of the through hole 21.

Referring to FIGS. from 3 to 6 and FIGS. 1 and 2 again, a rope 3 is inserted through a through hole on the pull tab 4 of a zipper slide, then the two opposite ends of the cord 3 are inserted through the through hole 21 on the shell 2 into the receiving hole 121 on the rectangular frame of the body 12 of the retaining member 1, and then the retaining member 1 is inserted into the shell 2 to force the coupling flanges 123 of into engagement with the coupling grooves 22 on the shell 2, enabling the serrated end blocks 1221 of the springy clamping arms 122 to be squeezed inwards and clamped on the two opposite ends of the cord 3, and therefore the two opposite ends of the cord 3 are secured together by the clamp.

Figure 7:
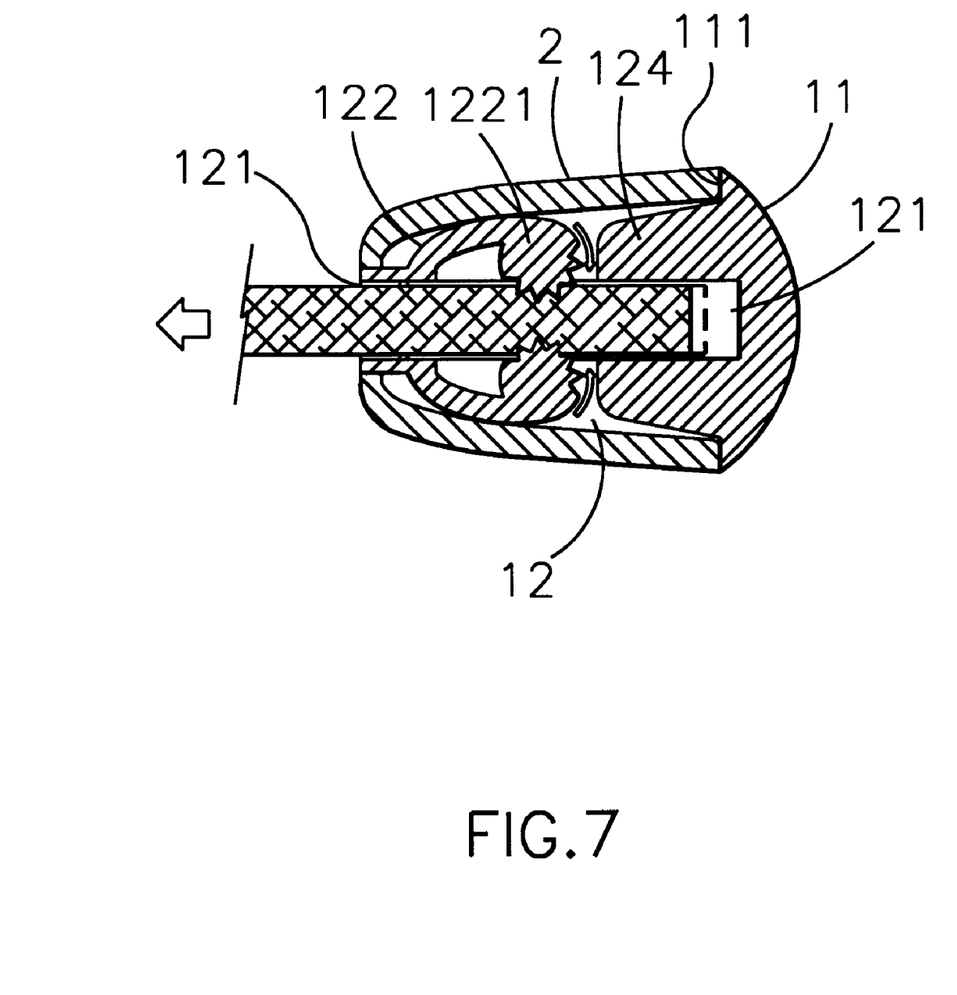
FIG. 7 is a sectional view of the present invention, showing the cord pulled outwards, the serrated end blocks of the springy clamping arms turned inwards.

Referring to FIG. 7, when the cord 3 is pulled outwards from the clamp, the serrated end blocks 1221 of the springy clamping arms 122 are respectively turned inwards through a minor angle to hold down the two opposite ends of the cord 3 tightly.

While only one embodiment of the present invention has been shown and described, it will be understood that various modifications and changes could be made thereunto without departing from the spirit and scope of the invention disclosed.

What the invention claimed is:

1. A clamp for joining the ends of a cord, comprising:
   a cup-like hollow shell having a center through hole and two coupling grooves at two opposite sides of said center through hole;
   a retaining member plugged into said cup-like hollow shell to hold down the ends of the cord being inserted into the center through hole on said cup-like hollow shell, said retaining member comprising a clamping unit at one end plugged into said cup-like hollow shell, and a head integral with one end of said clamping unit and stopped outside said cup-like hollow shell, said clamping unit comprising a tapered hollow block extended from said head, a rectangular frame, two elongated connecting walls connected between said tapered hollow block and said rectangular frame at top and bottom sides, a receiving hole defined within said rectangular frame which receives the ends of the cord, and two springy clamping arms respectively raised from left and right side walls of said rectangular frame and curved towards said tapered hollow block and terminating in a respective end block, the end blocks of said springy clamping arms being forced inwards and clamped on the ends of the cord at two opposite sides to hold down the ends of the cord in said retaining member.

2. The clamp of claim 1 wherein the end blocks of said springy clamping arms are serrated.

3. The clamp of claim 1 wherein said cup-like hollow shell has two coupling grooves at two opposite sides of the center through hole thereof, said retaining member has two coupling flanges respectively raised from top and bottom side walls of said rectangular frame and forced into engagement with the coupling grooves of said cup-like hollow shell.

* * * * *